United States Patent [19]

Wolter et al.

[11] Patent Number: 4,556,428
[45] Date of Patent: Dec. 3, 1985

[54] METHOD FOR THE MANUFACTURE OF CALCAREOUS BONDING AGENTS, PARTICULARLY CEMENT

[75] Inventors: Albrecht Wolter, Cologne; Horst Herchenbach, Hennef, both of Fed. Rep. of Germany

[73] Assignee: Klöckner-Humboldt-Deutz AG, Fed. Rep. of Germany

[21] Appl. No.: 614,143

[22] Filed: May 25, 1984

[30] Foreign Application Priority Data

May 26, 1983 [DE] Fed. Rep. of Germany ....... 3319083

[51] Int. Cl.$^4$ .............................................. C04B 7/02
[52] U.S. Cl. .................................... 106/102; 106/100
[58] Field of Search ................. 106/100, 102; 432/14, 432/106

[56] References Cited

U.S. PATENT DOCUMENTS

| | | | |
|---|---|---|---|
| 4,160,674 | 7/1979 | Sawyer | 106/102 X |
| 4,211,573 | 7/1980 | Abelitis | 106/100 |
| 4,217,143 | 8/1980 | Reich et al. | 106/102 X |
| 4,295,825 | 10/1981 | Ogawa et al. | 106/100 X |
| 4,370,127 | 1/1983 | Abelitis | 106/100 X |
| 4,381,916 | 5/1983 | Warshawsky | 106/100 X |
| 4,416,622 | 11/1983 | Touborg | 432/106 X |
| 4,431,453 | 2/1984 | Feige et al. | 106/100 |
| 4,435,159 | 3/1984 | Knudsen | 106/100 |

*Primary Examiner*—Andrew H. Metz
*Assistant Examiner*—Nam X. Nguyen
*Attorney, Agent, or Firm*—Hill, Van Santen, Steadman & Simpson

[57] ABSTRACT

A method and apparatus for the manufacture of calcareous bonding agents, particularly cement, through the burning of finely grained substances by means of hot gases. The finely grained materials in the form of a suspension pass through a preheating and calcining zone where ordinarily accumulations of alkali and chlorine leading to deposits and incrustations in the lines would occur. In order to minimize such deposit formation, a branch stream of suspended particles is removed from the main stream and the finely grained solid matter contained therein is burned to clinker in a separate reaction zone in suspension with a combustible gas. The airborne clinker thus produced may be eventually recombined with the clinker produced from the main line stream which passes through a rotary kiln.

7 Claims, 2 Drawing Figures

METHOD FOR THE MANUFACTURE OF CALCAREOUS BONDING AGENTS, PARTICULARLY CEMENT

BACKGROUND OF THE INVENTION

1. Field of the Invention

The present invention is in the field of treating calcareous bonding agents, particularly cement, involving the calcining of finely grained solids, the latter being conveyed by means of hot gases through a preheating and calcining zone, and subsequently into a rotary kiln where the solid matter separated from the hot gases is converted into clinker. The clinker is then cooled and ground to a cement product. The present invention involves separating off a branch stream of the suspended solid particles and treating them in parallel with the rotary kiln to produce an airborne clinker.

2. Description of the Prior Art

It is well known that cement calcining systems are susceptible to a build-up of alkali and chlorine compounds during the internal circulation of the suspended materials in the calcining system. In order to effectively counteract the known difficulties resulting therefrom, particularly due to the deposition of incrustations, it has previously been proposed to remove from the primary gas circulation stream between the rotary kiln and the heat exchanger system, a partial stream, to cool the stream for condensation of the harmful substances, to deposit and dispose of the harmful substances in the form of dust, and to exhaust the remaining gas in a bypass.

This existing system leads to losses of heat energy in the discharged partial gas current, as well as losses of solids. An additional disadvantage is the fact that the elimination or the further utilization of the dust deposited in the bypass installation must be eliminated from the production process. The difficulties caused by such deposition are detailed in the publication "Zement-Kalk-Gips", Vol. 5, 1962, page 203.

SUMMARY OF THE INVENTION

The present invention seeks to reduce harmful substance accumulations to a tolerable degree for undisturbed continuous operation and to reduce, if not largely avoid, the losses of heat and material and thereby reduce the manufacturing costs of cement production. In addition, the outlay of capital expenditure costs is to be achieved through a further reduction of the dimensions of the rotary kiln as well as the clinker cooler and the grinding installation for grinding the clinker aggregate.

Basically, the present invention involves separating a branch stream from the main stream of suspended cement meal being processed and conveyed through the preheating and calcining zone, the branch stream with the fine grained solid material contained therein is thereupon calcined to clinker in a separate reaction zone in suspension in a combustible gas.

Through the use of the present invention, there is an advantage that the hot raw meal contained in the branch stream need not be driven off from the system. As a consequence, in accordance with one of the underlying objectives, losses of material energy and heat energy are avoided. Because a relatively high fraction of chlorine and alkali compounds is contained in the branch stream, the alkali and chlorine management is so advantageously controlled that a building up of the alkali and chlorine in the kiln system and, in particular, in the heat exchanger system is substantially prevented. The branching-off of the side stream according to the present invention proceeds at a location between the preheating zone and the clinker reactor. At this location, concentrations in the meal of chlorine compounds and alkali compounds are comparatively high for which reason a relatively low quantity of the branched stream is sufficient in order to maintain an undisturbed circulatory equilibrium.

In a preferred embodiment, the branching off of the branch stream proceeds at a temperature between 450° and 950° C. and preferably in the range from 750° and 950° C.

In another preferred form of the invention, the branch stream is burned in a suspension reactor with the addition of a gaseous fuel. It is further provided that the branch stream in the suspension reactor is burned by means of a combustible gas at temperatures in the range of alite formation, which exist at about 1,250° to 1,400° C. At these temperatures, chlorides are volatilized, and thus the most frequently harmful chlorine compounds in the material to be burned are reduced whereas the concentration of alkali sulphates may possibly increase due to the sulphur concentration of the supplied fuel.

There is another advantage that the branch stream, after the clinker burning, is separated into solid matter and gas, with the solid matter being cooled in a dust cooler and subsequently at least partially mixed with mill cement. By this measure, several advantages are realized. For one, the load on the clinker cooler is reduced and, for another, a solid matter loss is very advantageously prevented. Finally, mill capacity and grinding energy are saved since the dust or pulverized clinker need not, for the most part, be ground to reduce its coarse grain.

Another advantage resulting from the invention is that the combustible gas separated from the solid matter, with a low harmful substance concentration, can at least partially be returned to the preheating zone. A loss of heat energy is thus avoided. This is permissible in many cases because the predominating portion of the harmful substances is bound to the finely grained solid matter. In the case of a higher harmful substance concentration in the combustible gas, it is possible for the gas to be driven off at least partially in a bypass. This flexibility is one of the significant advantages of the method of the present invention.

An additional recovery of heat is also possible in that hot exhaust air from the dust cooler may be conveyed in the form of tertiary air into the calcining zone. This procedure has a particularly favorable effect in the case of systems in which the air flow combustion for the calcinator is drawn by the rotary kiln, which systems accordingly do not possess any separate tertiary air line.

A significant embodiment of the method of the present invention consists in suspending fine grained solid matter such as cement meal in hot gas, preheating the same, dehydrating the same, and at least partially calcining it. The stream is then divided into a primary and a branch stream. The solid matter is conveyed in a main stream after separation from the suspending gas in a rotary kiln, and is burned to a clinker. The solid matter carried along in the branch stream which is in suspension in a combustible gas is passed to a parallel burning operation in a suspension type reactor adjacent the rotary kiln where it is burned to form an airborne dust clinker. The rotary kiln clinker is cooled in a clinker cooler and the airborne dust clinker is cooled next to the clinker cooler in a dust cooler. The rotary kiln clinker is ground and is processed with the fine grained airborne dust clinker, with the possible addition of additional substances, to form the end product. Thus, a possibly excessive high free calcium concentration, particularly in the airborne dust clinker is at least partially reduced.

An additional feature of the present invention provides for the addition of iron carriers such as iron oxide in the region between the branching-off of the branch stream and the rotary kiln. These iron carriers involve the addition of melt phase-forming iron oxide compounds and the like which up to the present time have customarily been added to the furnace inlet meal during the raw meal dressing.

In the method of the present invention, it is advantageous that only a very low fraction of melt phase-forming compounds is contained in the branch stream in order to not endanger the operation of the suspension or airborne dust reactor as well as the separator connected thereafter. This can be achieved according to the present invention since the addition of iron carriers proceeds only in the region between the branching-off of the branch current and the rotary kiln.

The apparatus for the manufacture of calcareous bonding agents according to the present invention includes a preheater, a calcinator, a rotary kiln which functions as the clinker burning installation, a clinker cooler and optionally a subsequent clinker grinding system. Between the preheater and the clinker burning installation there is provided a branch for a stream of suspended particles which empties into a suspension reactor or airborne dust reactor, respectively. With this arrangement, a compact system results whose capital expenditure costs are reduced by virtue of the fact that both the clinker reactor as well as the clinker cooler and the subsequent clinker grinding installation can be reduced by a proportion of capacity which corresponds to the throughput in the branch circuit. Since the airborne reactor is a stationary installation in comparison with the rotary kiln, this type of reactor uses smaller dimensions, and has lower radiation losses, higher thermal efficiencies, and relatively lower capital expenditures. The airborne dust reactor includes at least one inlet for the addition of fuel. The airborne dust collector is connected to a solid/gas separating installation which comprises a solid discharge means which advantageously discharges into a dust cooler.

Further advantages are achieved in that the solid discharge of the dust cooler after possibly being temporarily stored in a storage bin, is subjected to transport to an apparatus for mixing and/or homogenizing. In this apparatus, the discharge of the clinker cooler and grinding system is combined with the solid discharge from the dust cooler to produce a final product. Accordingly, different cement products can be manufactured by blending various amounts of mill cement with airborne dust clinker and possibly additional additives.

In accordance with the present invention, the dust cooler is equipped with an exhaust air line which is connected to the calcinator. Consequently, the heat energy contained in the airborne dust clinker is recuperated and introduced as hot tertiary air into the calcinator. This produces an efficient use of additional hot tertiary air for the reactions occurring in the calcinator and provides special advantages in the case of systems that have no separate tertiary air line and as a consequence must draw combustion air for the calcinator in the form of air passing through the furnace.

In order to get rid of the harmful substances, at least a portion of the exhaust gas occurring in the separating installation can be discharged in the bypass. An additional bypass line can be connected to the exhaust gas line, and throttle members are provided in both lines.

BRIEF DESCRIPTION OF THE DRAWINGS

The invention will be explained in greater detail together with its advantages on the basis of a sample embodiment illustrated in the drawing, in which.

DESCRIPTION OF THE PREFERRED EMBODIMENTS

Figure 1:
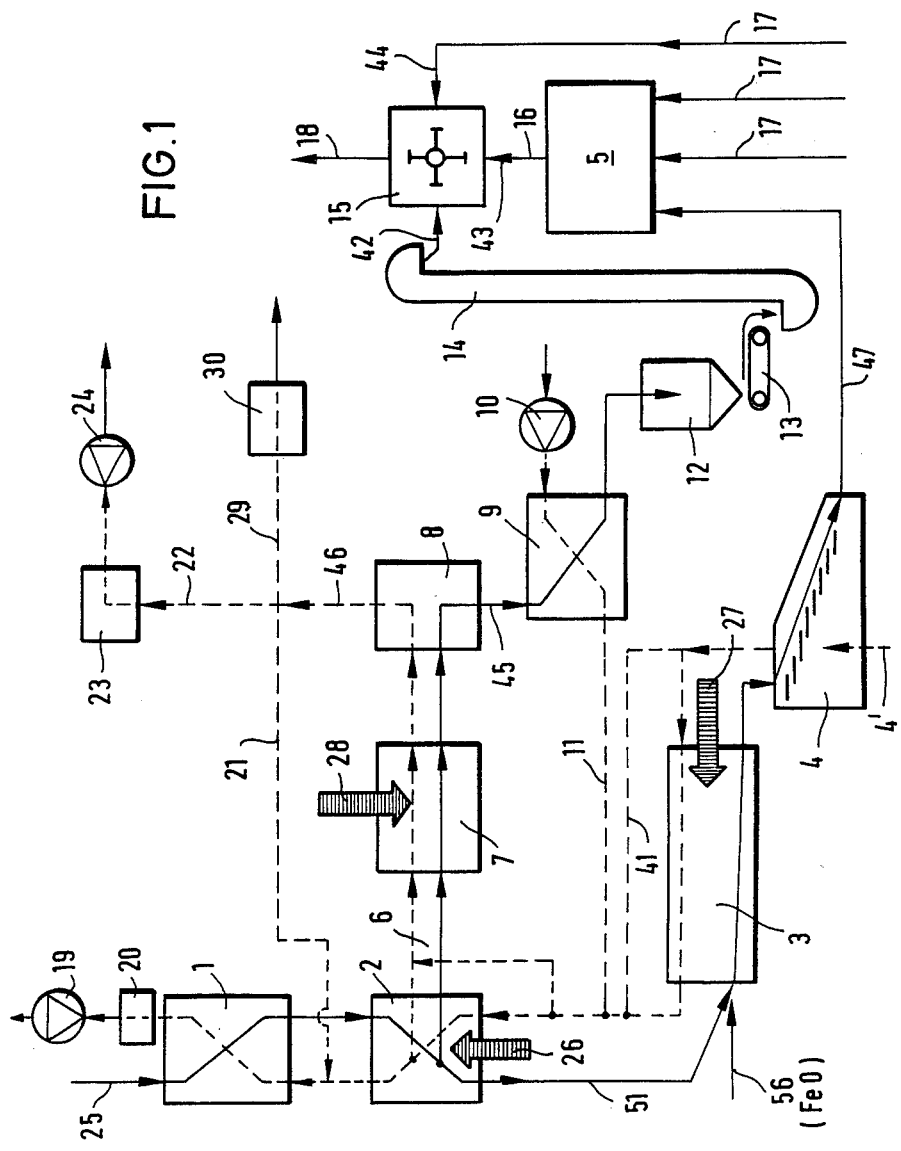
FIG. 1 illustrates a block circuit diagram of a calcining system for the manufacture of calcareous bonding agents.

The system shown in FIG. 1 includes a meal inlet 25 which delivers the raw meal to a heat exchanger system identified generally at reference numeral 1. Following the heat exchanger 1 is a calciner 2, a rotary kiln 3, and a clinker cooler 4 through which cool air is admitted through an inlet 4′. The system also has a clinker grinding system 5 as well as a mixing and homogenizing installation 15 into which a cooled dust clinker is admitted through a line 42, mill cement through a line 43, and, optionally, an additive through a line 44. The result is a mixed product of calcareous bonding agents, consisting of cement which is discharged through a discharge line 18.

In the region of the calcinator 2 there is a branch conduit 6 which leads to a suspension reactor or airborne dust reactor identified at reference numeral 7. It will be seen that the reactor 7 is in parallel relationship with the rotary kiln 3. Fuel is added to the calcinator 2 by means of a line 26 and to the airborne dust reactor 7 by means of a line 28. The branch stream in suspension in gas enters the airborne dust reactor 7 at temperatures between 450° and 950° C., preferably in the range from 750° to 950° C. where it is heated through combustion of the fuel entering through the inlet 28 to alite formation temperatures of between 1,250° and 1,450° C. The fine grained solid matter is thus burned to an airborne dust clinker. In the following separation installation 8, the separation of solid and gas takes place and the solids, by means of the line 45, are introduced into a dust cooler 9. The latter receives cooling air through a blower 10 and releases heated tertiary air by means of a line 11 into the calcinator 2. The cooled airborne dust clinker is discharged into an intermediate receptacle 12 and temporarily stored therein. A conveyor member 13 supplies the cooled airborne dust clinker as required to a transport installation 14 and subsequently to the inlet line 42 leading to the mixing and homogenization installation 15.

In the separation installation 8, exhaust gas which has been separated from the solid matter is removed through an exhaust line 46 and, depending upon the concentration of harmful substances is either supplied by means of a line 21 to the heat exchanger system 1 or in the case of high harmful substance concentration, is conducted into the air by means of a bypass line 22, an exhaust gas cleaner 23 and then an exhauster 24. A gas branch line 29 may also be provided to deliver the gas to a heat utilization source 30.

Fuel is supplied to the rotary kiln 3 through an inlet 27, and the fuel in the overall heat balance can be reduced by the fraction of the fuel supplied to the airborne dust reactor through the line 28. Since the airborne dust reactor 7 in comparison with the rotary kiln 3 possesses smaller exterior dimensions, and as a consequence of the high active surface properties of the airborne dust, it achieves a substantially better efficiency in the case of heat transfer than the rotary kiln 3. Therefore, there exists a higher utilization degree of the primary source of energy and to this extent an increased economy in operation results.

From the clinker cooler 4 there is a tertiary air line 41 which leads to the calcinator 2. The latter also, in the case of the new system, can be kept smaller in its dimensions than customarily since with the additional tertiary air line 11, high temperature tertiary air is introduced from the dust cooler 9 into the calcinator 2. The system may also include inlets 17 for the addition of plaster of paris and/or other additives to the clinker grinding system 5 or to the mixing and homogenizing system 15, respectively. The gas flow of the system which is conveyed in countercurrent relation to the furnace meal inlet 25 after delivery of its useable heat content by means of the exhauster 19 is removed from the system and customarily is passed through a gas cleaning apparatus 20.

Figure 2:
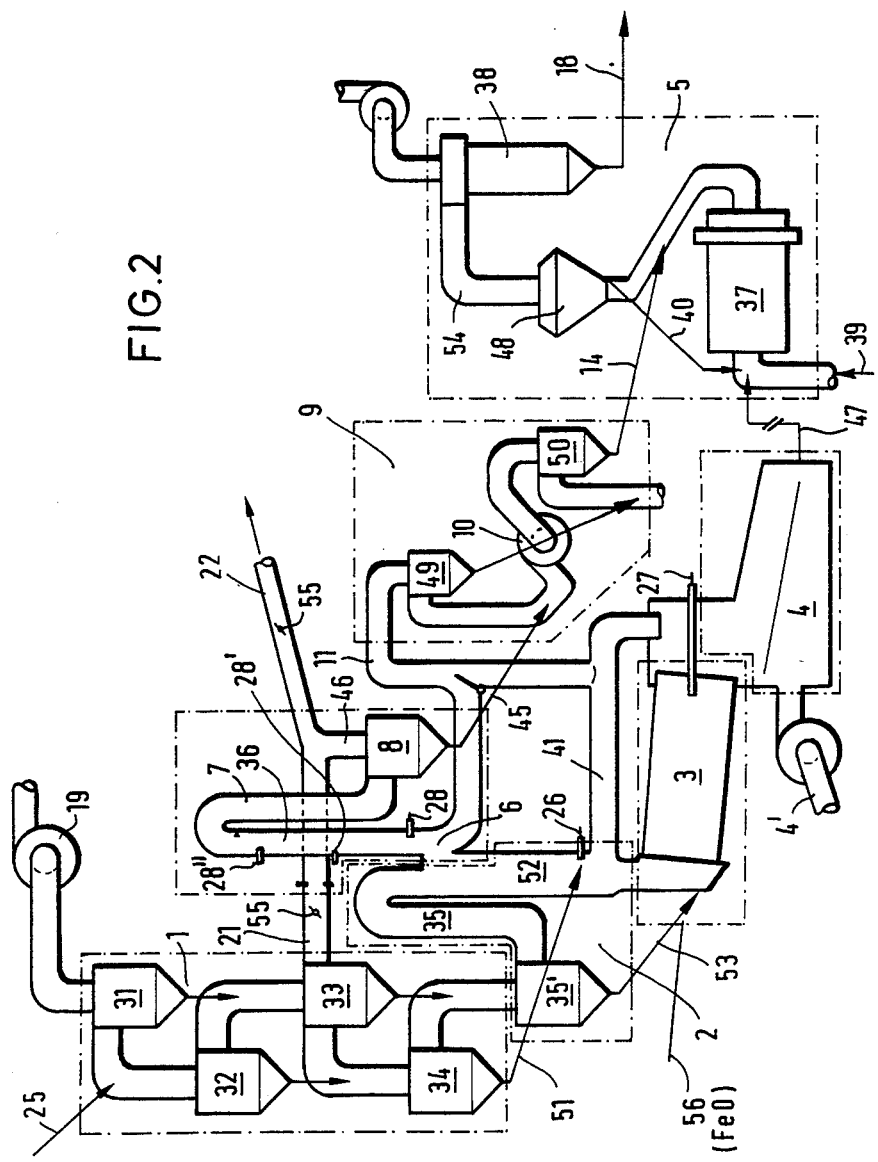
FIG. 2 illustrates a schematic system based on FIG. 1, with symbolized system parts.

In FIG. 2, the same system is illustrated as in FIG. 1 in a more schematic representation. The individual functional areas such as the heat exchanger system 1, calcinator 2, rotary kiln 3, clinker cooler 4, separator grinding system 5, airborne reactor 7, and the cyclone cooler 9 are illustrated in fields bounded by dash-dot lines. The same functional elements as in FIG. 1 are identified with the same reference numerals.

The heat exchanger system 1 includes a charging installation 25 for the furnace inlet meal and in addition has four cyclone stages 31 through 34. The calcinator 2 comprises a reaction column 35 as well as a depositor 35' and at least one charging point 26 for fuel. The rotary kiln 3 is connected with the clinker cooler 4 in the usual fashion through a common housing part in which a burner 27 is arranged. The cooler 4 comprises a cooling air blower 4' and in addition a transport installation 47 for charging cooled clinker into the grinding system 5. The latter, in turn, includes a mill 37 with a hot gas supply 39 as well as a sifter or separator 48. Coarse powder is discharged through a line 40, the finished product goes into a depositor 38 and then into a finished product discharge line 18. Indicated purely schematically is a transport installation 14 from the dust cooler 9 by means of an intermediate storage installation 12, 13 shown in FIG. 1.

In the example of FIG. 2, a sifter 48 simultaneously serves as a mixing and homogenizing device and combines this function with the advantage that minor oversized powder components, possibly contained in the dust clinker, are separated from the fine product and by means of the coarse powder discharge line 40 are supplied to the mill 37 for crushing. The sample embodiment in FIG. 2 further shows a branch 6 of the branch circuit from the region of the calcinator 2 to the subsequent suspension reactor or airborne dust reactor 5, respectively. The latter includes a reaction zone 36 having fuel charge inlets 28, 28' and 28''. In addition, the airborne dust reactor 7 includes a separating installation 8 provided with a discharge line 45 which delivers hot airborne dust clinker into the cyclone cooler 9. The latter contains two cyclone cooling stages 49 and 50 with fans or blowers 10 arranged between the two. A charging inlet for iron compounds is indicated in the region of the rotary kiln inlet by an arrow 56 in a purely schematic fashion.

The operation of the device is apparent from the sample embodiments illustrated in FIGS. 1 and 2. A furnace inlet meal charged into the inlet line 25 is heated in the heat exchanger system 1 by passing through the heat exchanger cyclone stages 31 through 34 in countercurrent relationship with hot gas. The heated raw meal is delivered from the lowest cyclone stage 34 by means of a line 51 to a connection line 52 running from the rotary kiln head to the calcinator 2. It is there completely calcined pursuant to the supply of fuel entering through the line 26 together with tertiary air from a line 41 as well as hot furnace gases from the rotary kiln 3 in the reaction column 35 at temperatures of about 950° C. The meal is then separated in the separator 35' from the gas and delivered by means of the line 53 into the furnace inlet head of the rotary kiln 3. There, the mealy calcined product in the product bed, possibly with the addition of iron carriers to the line 56, is burned to clinker temperatures up to about 1450° C. The clinker is cooled in the clinker cooler 4 to such an extent that the cooled clinker can be charged into the mill 37.

In accordance with the present invention, a suspension branch stream is branched off through the branch line 6 from the main suspension stream in the region of the calcinator 2 and, in the suspension reactor or airborne dust reactor 7, is delivered through the reaction zone 36. With the addition of fuel at the inlet points 28, 28' and 28'', the branch stream is burned at clinker temperatures of between 1,250° and 1,400° C. In the separator 8, the airborne dust clinker is separated from the gas current and by means of a line 45 is charged to the cyclone cooler 9 wherein it is delivered in the conventional manner through cyclone cooling stages 49 and 50 in direct contact with cooling air. After cooling, it is charged at temperatures of about 150° C. through the transport installation 10 into the stream of the separator grinding system between the mill 37 and the separator 48. That portion of the airborne dust clinker which has a satisfactory fineness in accordance with specifications, is then discharged through the separator line 54 into the separator and subsequently into a discharge line 18. Oversized powder together with coarse powder or granules is supplied through coarse powder inlet line 40 to the charging side of the mill 37. In this manner, an absolutely homogeneous mixing of mill cement and airborne dust clinker to provide the end product is obtained.

As is apparent from FIG. 1, inlet line 17 may be used to supply plaster of paris and/or other additives to the mill 37 or to the homogenizing and mixing installation 15. Entering into the airborne dust reactor 7 through the branch line 6 are components of mineral meal, enriched with alkali and chlorine compounds from the burning system. The removal of these harmful components in this fashion unburdens the interior circulation of the burning system and prevents building up harmful accumulations of these substances. As a consequence of the clinker burning stage up to temperatures of around 1,350° C., chlorine compounds are thus volatilized and either conducted into the free air in the exhaust gas of the airborne dust reactor by means of line 21, through the cyclone preheater 1 and the exhauster 19, or at least partially driven off by means of the bypass line 22. In both lines 21 and 22 there are provided throttle members 55 which render possible an adjustment of the exhaust gas partial stream.

By branching off the branch stream in the line 6 not only is the interior circulatory system of the burning system unburdened, but also the quantity of materials passing through the rotary kiln 3 is reduced by a factor of usually 10 to 15%. As a consequence, the rotary kiln 3 can be reduced in dimensions, thus providing savings in capital expenditures and operating costs. In addition, the system through the steps of product-mixing, possesses the advantage of a multiple variable adjustment of cement properties. Through the production of the airborne dust clinker, grinding energy and heat energy are saved.

Also significant is the disposition of the rotary kiln unit and the dust clinker unit in parallel in a common production unit as well as the possibility of mixing mill cement with dust clinker during or after the cement grinding so as to obtain or modify different optimum cement properties.

It should be evident that various modifications can be made to the described embodiments without departing from the scope of the present invention.

We claim as our invention:

1. A method for the manufacture of cement which comprises:
   preheating raw cement meal,
   at least partially calcining the preheated meal,
   dividing the thus treated meal into a primary stream and a branch stream,
   burning the particles in said primary stream in a rotary kiln to form clinker,
   suspending the particles in said branch stream in a combustible gas,
   burning the suspended particles in said branch stream in a suspension reactor in parallel with said rotary kiln to produce an airborne dust clinker,
   cooling both the clinker from said rotary kiln and said airborne dust clinker,
   grinding the clinker from said rotary kiln, and
   combining the ground clinker with the airborne dust clinker.

2. A method according to claim 1 wherein said branch stream is drawn off while at a temperature in the range from 450° to 950° C.

3. A method according to claim 1 wherein said branch stream is drawn off while at a temperature in the range from 750° to 950° C.

4. A method according to claim 1 wherein said branch stream is burned by means of a fuel gas under conditions favoring the formation of alite, including a temperature of about 1250° to 1400° C.

5. A method according to claim 1 which includes the step of:
   separating solids from the clinker produced by burning said branch stream and
   at least partially returning the combustible gas separated from said solids into the preheating zone.

6. A method according to claim 1 which includes the step of:
   passing hot exhaust air resulting from the burning of said branch stream into said calcining zone as tertiary air.

7. A method according to claim 1 which includes the step of adding iron oxide to the calcined material before introducing the same into said rotary kiln.

* * * * *